United States Patent
Glass et al.

(10) Patent No.: US 6,682,287 B2
(45) Date of Patent: Jan. 27, 2004

(54) SEGMENTED LINK ROBOT FOR WASTE REMOVAL

(75) Inventors: Samuel W. Glass, Lynchburg, VA (US); Frank C. Klahn, Huddleston, VA (US); Dennis W. Saville, Goode, VA (US)

(73) Assignee: Framatome ANP, Inc., Lynchburg, VA (US)

(*) Notice: Subject to any disclaimer, the term of this patent is extended or adjusted under 35 U.S.C. 154(b) by 0 days.

(21) Appl. No.: 09/996,646

(22) Filed: Nov. 20, 2001

(65) Prior Publication Data

US 2003/0147725 A1 Aug. 7, 2003

Related U.S. Application Data

(60) Provisional application No. 60/252,313, filed on Nov. 20, 2000.

(51) Int. Cl.[7] .................................................. B25J 1/00
(52) U.S. Cl. .............................. 414/8; 901/27; 901/47; 406/113
(58) Field of Search .............................. 414/8; 901/47, 901/27, 113, 114, 115; 406/116

(56) References Cited

U.S. PATENT DOCUMENTS

| | | | | |
|---|---|---|---|---|
| 3,888,362 A | * | 6/1975 | Fletcher et al. | 414/620 |
| 4,406,502 A | * | 9/1983 | Teramachi | 384/45 |
| 4,523,884 A | * | 6/1985 | Clement et al. | 414/8 |
| 4,715,324 A | * | 12/1987 | Muller et al. | 122/381 |
| 4,850,779 A | * | 7/1989 | Cashell et al. | 414/3 |
| 4,975,016 A | * | 12/1990 | Pellenc et al. | 414/501 |
| 5,219,470 A | * | 6/1993 | Bradley et al. | 210/767 |
| 5,762,467 A | * | 6/1998 | Sturm et al. | 414/729 |
| 5,782,209 A | * | 7/1998 | Vandenberg | 122/379 |
| 5,802,201 A | * | 9/1998 | Nayar et al. | 382/153 |
| 5,855,540 A | * | 1/1999 | Sturm et al. | 483/16 |
| 6,039,068 A | * | 3/2000 | Tessier et al. | 137/377 |

* cited by examiner

*Primary Examiner*—Joseph A. Dillon
(74) *Attorney, Agent, or Firm*—Vytas R. Matas

(57) ABSTRACT

The present invention is drawn to an incremental link robot mast for vacuuming nuclear waste from a storage silo. The mast is made of incrementally linked segments that are clamshell in construction to enclose and shield the working cables of the vacuuming robot. Each segment is linked together as needed by a transverse hinge pin and two hydraulic connecting pins. The clamshell is hinged and latched together by an array of screws. The robot comprises a linked clamshell mast and a master-slave robot arm on the end of the mast which includes tools for viewing and breaking up the waste and vacuuming same to a removal area.

9 Claims, 7 Drawing Sheets

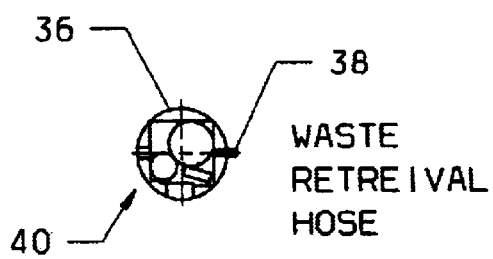
FIG 3A      FIG 4A
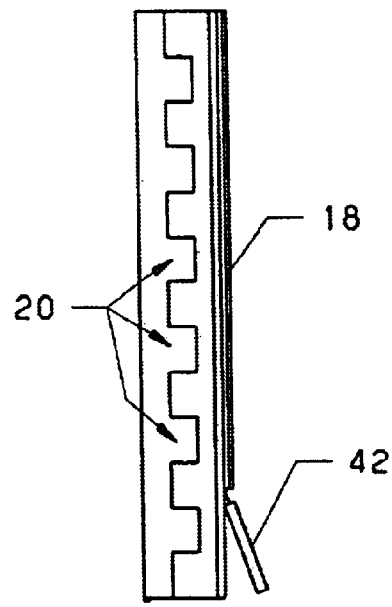
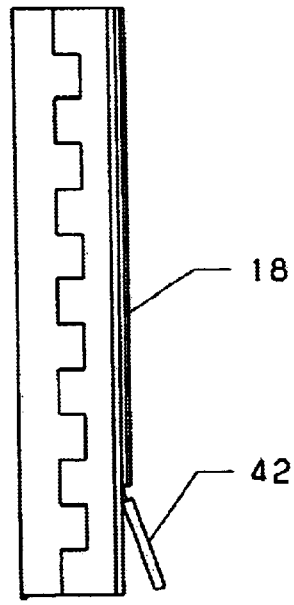
FIG 3      FIG 4

SECTION I-I

SEGMENTED LINK ROBOT FOR WASTE REMOVAL

This application claims the benefit of Provisional Application No. 60/252,313 filed Nov. 20, 2000.

BACKGROUND OF THE INVENTION

1. Field of the Invention

The present invention relates generally to waste removal systems and more particularly to systems for removing nuclear waste from a storage silo.

2. Description of the Prior Art

It is known to use long-reach arm devices to reach into tanks or silos through small openings to sample or remove waste. Many of these devices have been sponsored and developed by the Department of Energy to deal with tank and silo waste cleanup problems.

At Oak-Ridge National Labs, a Spar Light Duty Utility Arm (LDUS) has been used to manipulate a sleucing head to remove waste material from the GUNITE tank farm. The SPAR arm was deployed from a tower enclosure that is longer than the arm. Access to the tank was an opening approximately two feet in diameter and the vertical and horizontal reach was approximately 40 feet. The Spar LDUA arm is an 8 ft. hydraulically actuated arm with a general-purpose gripper on the arm end. The gripper was used to hold a sleusing head that was deployed through a separate opening in the tank. The sluicing head was partially supported by an auxiliary actuated pipe structure to hold the weight and to convey the waste material out of the tank. The pipe structure and sleucing head also required a tower enclosure as long as the sleucing pipe.

A truck—deployed version of the arm has also been developed. This is a similarly designed arm but is designed for deployment from a large truck platform. An ancillary truck structure must be used for a sleucing head or alternative waste conveyance system that is required to actually remove waste or do any work.

Grey Pilgrim Company has developed a cable-driven arm, EMMA that features a large working channel through the center of the structure. This device also requires an auxiliary structure for the waste conveyance tube. The Grey Pilgram arm has been well studied and well publicized in the literature, however, there are no known successful deployments of the arm, to date, on large sized structures.

In the concrete industry, the grain industry, the coal industry, and other commercial industries requiring vacuum conveyance of dry material, large, long-reach hydraulic arms are commonly used. These arms, however, do not require special enclosures to contain radioactive material, and need not be deployed through very small openings in the tank or silo.

Nuclear waste removal systems are also documented in numerous U.S. Patents some of which are mentioned below.

U.S. Pat. No. 5,782,209 teaches a segmented automated nuclear waste removal lance where the individual segments are connected by pins to form a rigid lance inside the reactor. There is no vacuuming of the sludge; instead there is a blowing of the sludge from the tubes and reactor plates by the segmented lance. Also, there is no teaching of individual linked clamshell segments enclosing the working cables and the vacuuming tube of the system.

U.S. Pat. Nos. 5,219,470 and 4,715,324 teach vacuuming nuclear waste sludge removal systems. However, there is no teaching of any design for enclosing the working elements of the system including the vacuum line to shield from radioactivity.

A careful review of the prior art thus shows that while segmented nuclear waste removal systems may be known a design of linked segments for same which would be properly shielded from emitting radioactivity was needed.

SUMMARY OF THE INVENTION

The present invention solves the problems associated with prior art devices as well as others by providing a Revolving Turret Reeled cable incremental link Extending Vacuuming Robot (ReTRIEVR). The robot system is deployed from a gantry structure to break up and vacuum waste from the confined-space Silo-3 structures. Silo-3 is an 80-ft diameter 35-ft high domed structure housing dry powdery or granular metal oxide waste byproducts from processing concentrated uranium ore in the early days for the US nuclear program.

The ReTRIEVR is a long-reach robot that combines a segmented-link-mast (~60 feet long) with an industrial Master-Slave robot on the mast end. Each link measures approximately 17 inches in diameter by 10 feet in length. A longitudinal hinge along the link permits clamshell closure around the working cables. The clamshell halves are latched together by a linear array of captive screws. Adjacent links are joined by a transverse hinge pin, and the two hydraulic cylinder connecting pins. Extending and retracting the hydraulic cylinders achieve active articulation. The ReTRIEVR robot is inserted through a 20-inch access hole in the center of the silo dome.

The end of the link platform features a six degree-of-freedom, hydraulically operated, dexterous robotic arm. The arm can hold and maneuver a vacuuming tube, a delumping tool, a fixative spray tool, and other tools that may be required to assist in waste retrieval. The mining strategy is to vacuum as much material as can be reached from a fixed mast position. The dexterous robot action followed by mast repositioning is repeated until the entire silo is emptied. After the bulk of the material is emptied, an air sweeper will aid the final removal and fixative spray will be fogged into the silo to seal any remaining contamination.

A turret assembly rotates both the arm and the system cables. A video Pan-Tilt-Zoom camera is installed under the turret before the arm is inserted to provide an overview of mining activities. The turret assembly acts on substantial bearings to keep arm loads away from the silo roof. The rotating turret sleeve is inserted just through the silo roof within a fixed flexible seal that joins the silo to the gantry enclosure.

A reeled cable drum assembly sits atop the turret to manage the vacuum hose, and the control umbilical cable. This assembly includes a steel cable winch that passes through the links and connects to the robotic arm base. The drums are driven by the winch motor through slip-clutch assemblies to keep tension on the cables at all times without an independent motor.

The mast and arm are deployed from a contamination-barrier gantry enclosure mounted atop a gantry structure that spans the silo. This gantry enclosure is large enough to support personnel to manually add and remove links, to decontaminate the ReTRIEVR system and to perform any repair or maintenance that may be required.

The control system is located within 150 feet of the gantry-enclosure. At the control station, a robotic arm master is used to manipulate the dexterous slave robotic arm. A set of switches is also available for "joint-by-joint" control of the link hydraulic valves, the winch, turret, PTZ video, etc. Link valves are controlled with a 3-position switch to "extend", "retract", or "hold" (no active servo positioning).

In view of the foregoing it will be seen that one aspect of the present invention is to provide a robot required a relatively small enclosure since the segments are attached and removed as the arm is lowered or raised.

Another aspect is to provide a robot having a central channel large enough to support large diameter vacuum hose.

Yet another aspect is to provide a robot having a conveyance system protected by clamshell mast links.

Still yet another is to provide a robot wherein the turret and gantry structure take all loads from the arm to have no loads imposed on the silo opening.

Still yet another is to provide a robot where practically all conceivable failure modes of the arm permit arm removal from the silo in accordance with the normal removal practice.

These and other aspects of the present invention will be more fully understood after a review of the following description of the preferred embodiment when considered with the accompanying drawings.

BRIEF DESCRIPTION OF THE DRAWINGS

In the drawings:

FIG. 3 is an end and top view of one of the clamshell links of the present invention shown closed around the operating cable and hose.

FIG. 4 is an end and top view of the clamshell link of FIG. 3 in an open position.

DESCRIPTION OF THE PREFERRED EMBODIMENT

Figure 7:
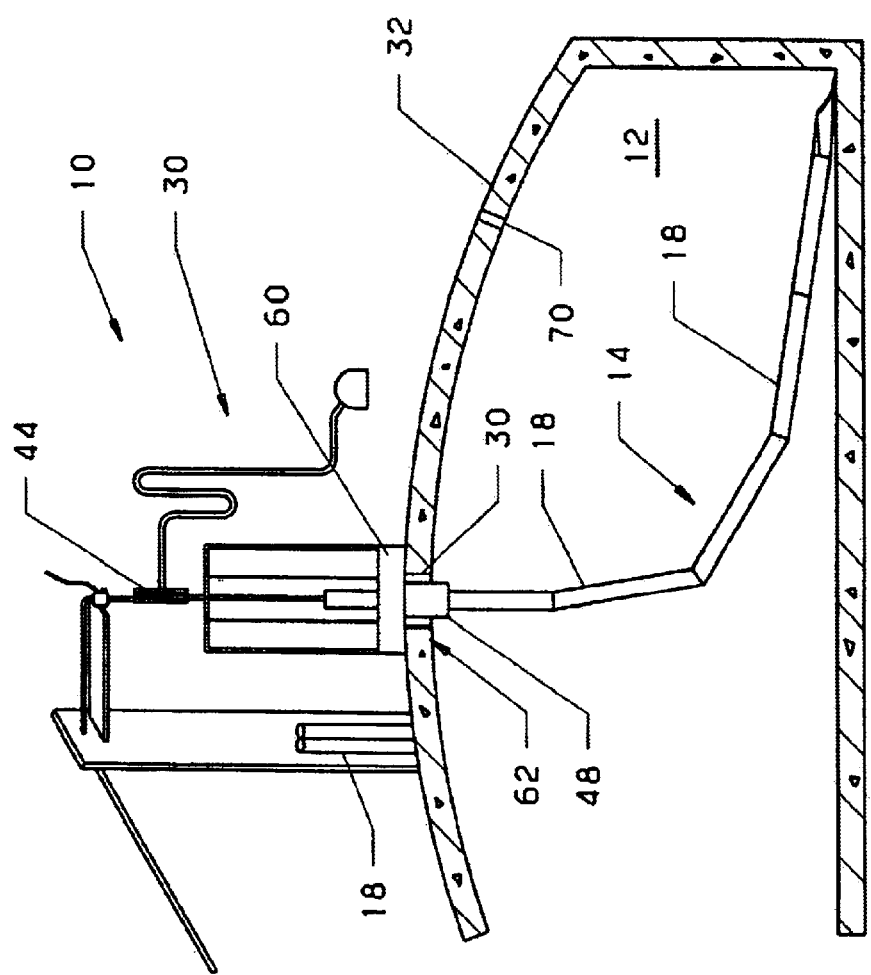
FIG. 7 is a schematic of the ReTRIEVR waste removal system mounted on a silo-3 unit.

Referring now generally to the drawings and will particular emphasis on FIG. 7 a Revolving Turret Reeled Cable Incremental Link Extending Vacuuming Robot system (ReTRIEVR (10)) is shown for waste removal activity from silo-3 sites. ReTRIEVR (10) is deployed from a known gantry structure to break up and vacuum waste from a Silo-3 site (12). Silo-3 is an 80-ft. diameter, 35-ft. high domed structure housing powdery, caked, or granular metal oxide waste by-products from processing concentrated uranium ore in the early days of the U.S. nuclear program.

Figure 1:
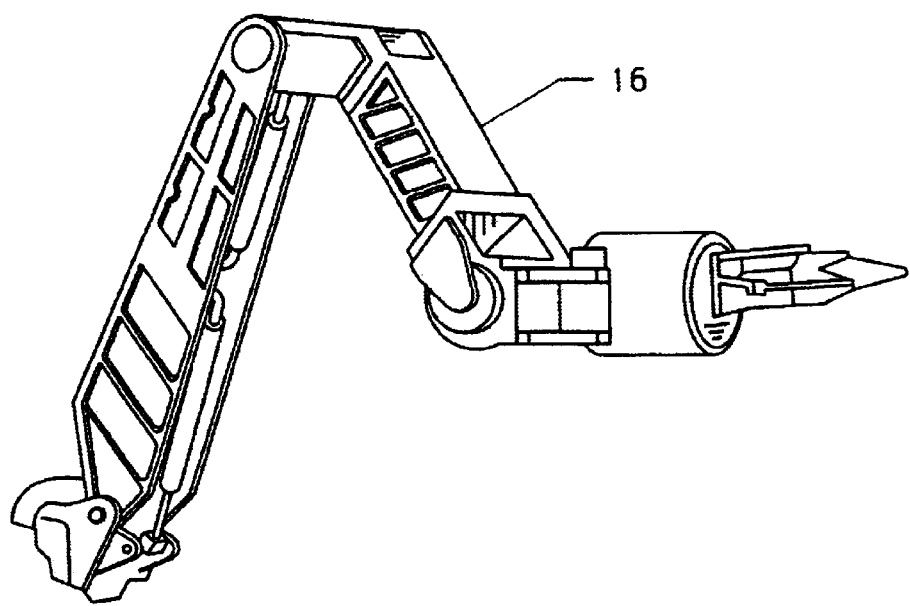
FIG. 1 is a depiction of a master-slave robotic arm used to operate the extended segmented links of the present invention.
Figure 2:
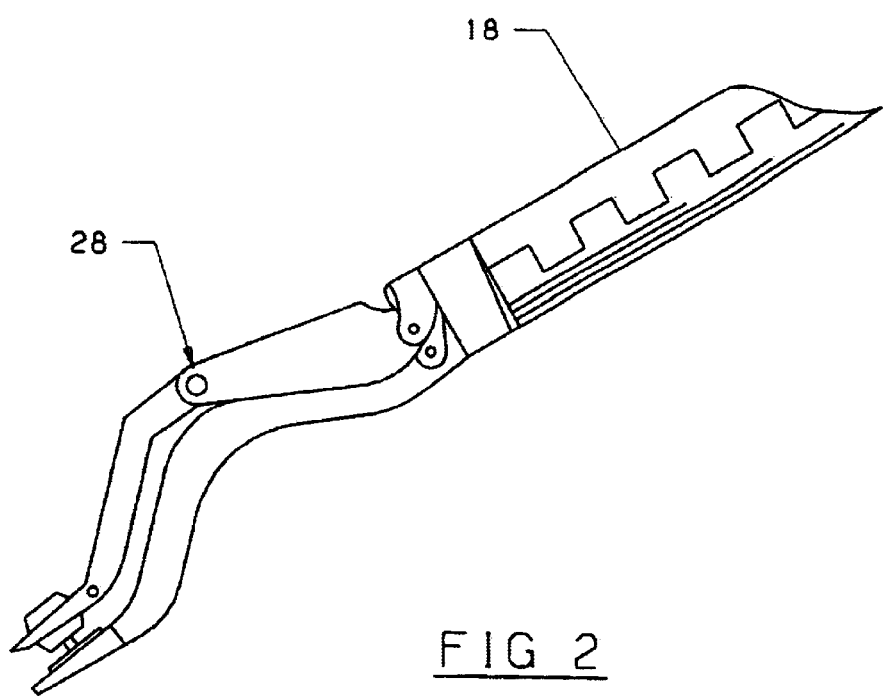
FIG. 2 is a perspective view of the slave arm connected to the segmented clamshell links and used to sweep the tank volume.
Figure 5:
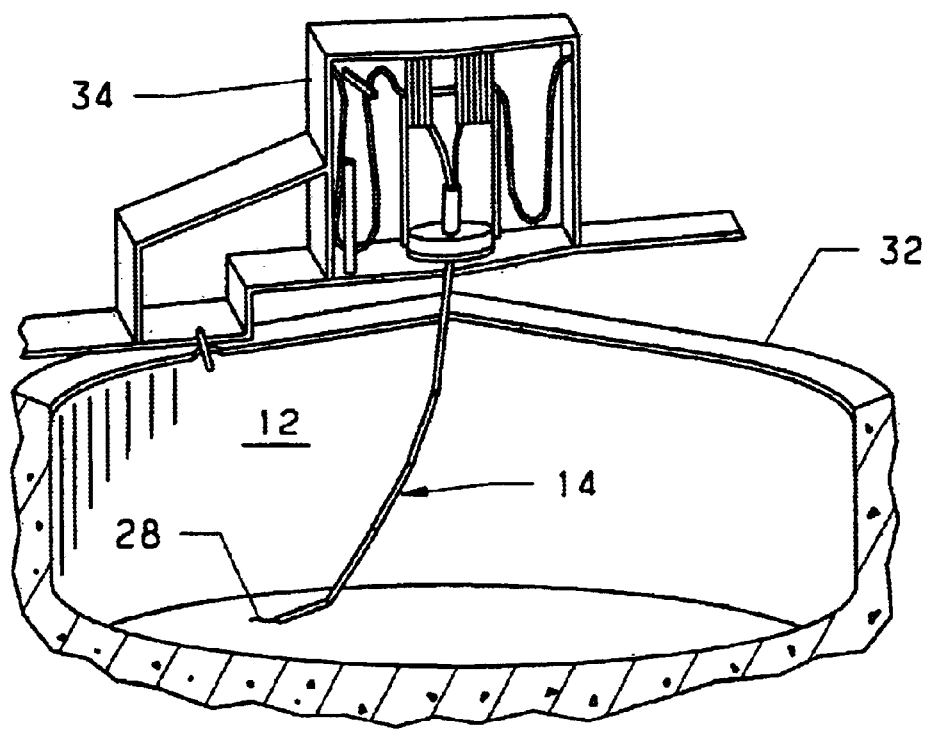
FIG. 5 is a schematic of a platform and containment enclosure on a type 3 silo used to display the slave arm and clamshell links to sweep the silo.
Figure 6:
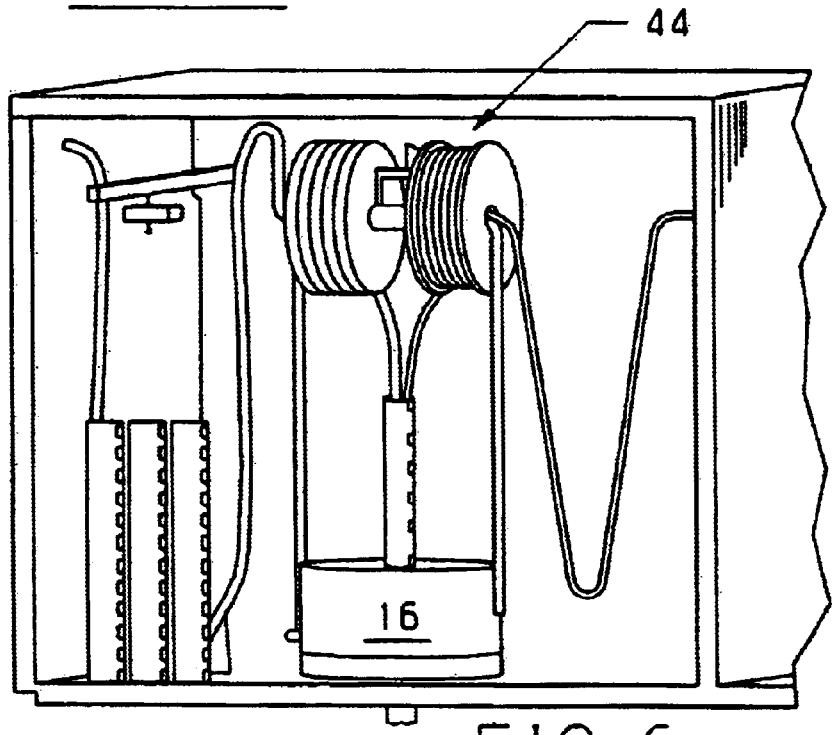
FIG. 6 is a schematic of the reeling system in the enclosure of FIG. 5 used to reel the conveyance and umbilical control lines into the clamshell segments.

The ReTRIEVR robotic system (10) combines a segmented-link mast assembly (14) of about 60 feet in length with an industrial master-slave robot (16) on the mast end (see FIG. 1). Each mast link (18), best seen in FIGS. 3, 4, and 8, measures approximately 17 inches in diameter by 10 feet in length. A hinge (20) along each link (18) permits clamshell closure around the working cables. Adjacent links (18) are joined by a transverse hinge pin (22) and the hydraulic actuator connecting pins (24). Active articulation is achieved by extending and retracting the hydraulic actuator (26).

The end of the ReTRIEVR system (10) features a six-degree-of-freedom, hydraulically operated, dexterous force feedback Robot arm (28). The arm (28) can hold and maneuver a vacuuming tube, a de-lumping tool, and other tools that may be required to assist in waste retrieval. The ReTRIEVR arm (28) and clamshell segments (18) are inserted through a 20-inch access hole (30) in the center of the Silo-3 dome (32).

The principal advantages of this system are:
high strength-to-arm diameter ratio;
conveyance working channel through the mast center simplifies hose management;
manual addition and removal of clam-shell links (18) minimizes overhead enclosure (34) demands.

Silo-3 (12) is an 80-ft. diameter, 35-ft. high domed structure housing powdery, caked, or granular metal oxide waste by-products from processing concentrated uranium ore in the early days of the U.S. nuclear program. Concerns about the integrity of the silo's concrete structure have prompted efforts to remove the waste and package it for long-term storage. This approach requires the vacuum of the material from the silo (12) by extending an 8-inch diameter vacuum hose (36) through the 20-inch diameter opening in the center of the concrete dome (12). The vacuumed waste material will be mixed with grout to produce environmentally stable logs suitable for burial.

One of the principal considerations is to avoid or minimize any loading on the dome. To assure no dome loads, a radial clearance of 1 inch is required between the ReTRIEVR components and the circumference of the access port. Thus, the effective opening available to the ReTRIEVR robotic arm (28) and the 8-inch hose is a maximum of 18 inches in diameter.

Additional ReTRIEVR system (10) requirements are:
to break up compacted and potentially saturated material;
to retrieve miscellaneous debris with up to 20 lbs. Lateral force and 100 lbs. Vertical dead lift;
to vacuum all interior surfaces to remove visible contaminated material'
to apply spray fixative to all interior surfaces following the vacuum cleaning.

To accomplish these goals the ReTRIEVR system (10) comprises certain major hardware components shown in FIG. 7. Each of these components will now be discussed individually.

Figure 8:
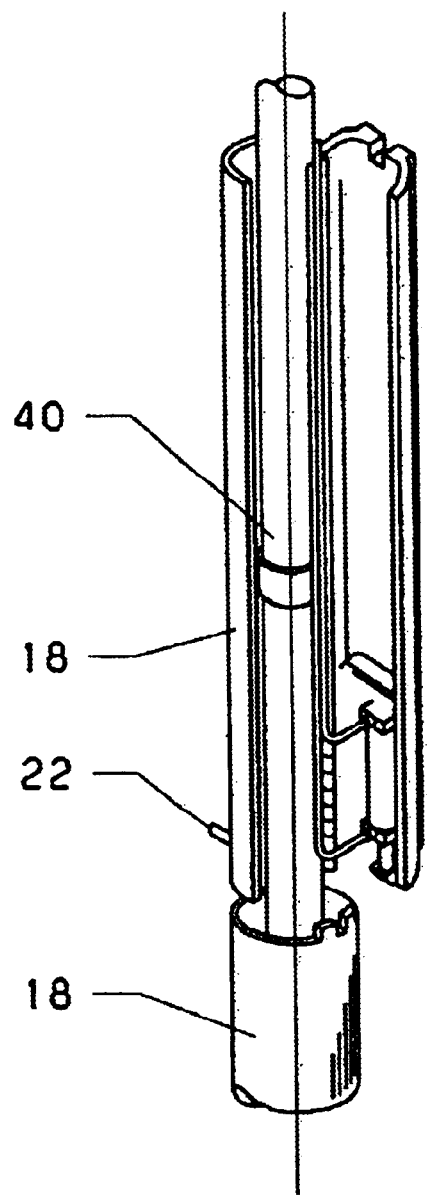
FIG. 8 is a side view of two clamshell segments being coupled together.

The mast (14) consists of up to seven link segments (18) each 20 feet long and 17 inches in diameter (see FIGS. 3, 4, and 8). The first three links (18) nearest the Kraft Robot arm (28) are thinner walled and have smaller hydraulic actuators than the other links to minimize the weight of the extended portion of the mast (14). The upper-most links are heavier, in order to support the fully extended system. The average weight of all segments is less than 500 lbs., including actuators, umbilical cables, hoses, fluid and waste. Each link (18) is hinged on one side in a piano-hinge (20) arrangement and secured with a series of captured screws (38) down the other side. This permits the segments (18) to be opened for assembly around the conveyance system tube (36) and the hydraulic and electric umbilical lines (40) for all lower components. Adjacent links are attached to each other with the pivot pin (22) on one half and a hydraulic actuator (42) on the other clamshell half. Each mast segment (18) can be articulated. relative to the next by up to 45 degrees using the appropriate hydraulic actuator (42).

The hydraulic hose umbilical (40) contains connection points appropriately spaced along its length, so that each extension segment can be connected as it is added to the assembly. The links (18) have an alignment groove along the full axial length to engage with the turret and provide circumferential positioning registration. The mast is raised and lowered by a winch (44) and held in place by a known turret clamp. The upper-most link has a safety collar above the turret clamp to prevent dropping the link through the clamp and into the tank (12). The safety collar must be in place whenever the turret clamp is opened to assure redundant protection from inadvertently dropping the mast into the silo.

The arm (16) is a Kraft Telerobotics commercial-grade RAPTOR arm with a force-feedback master and a custom forearm to facilitate passage through an insertion sleeve (48) located in the opening (30). The arm has a reach of 72 inches, weights 160 pounds, and has a lift capacity of 200 pounds (see FIG. 3 and Table 1). The arm joints are encoded by potentiometers and can be programmed to follow a predetermined path.

Figure 9A:
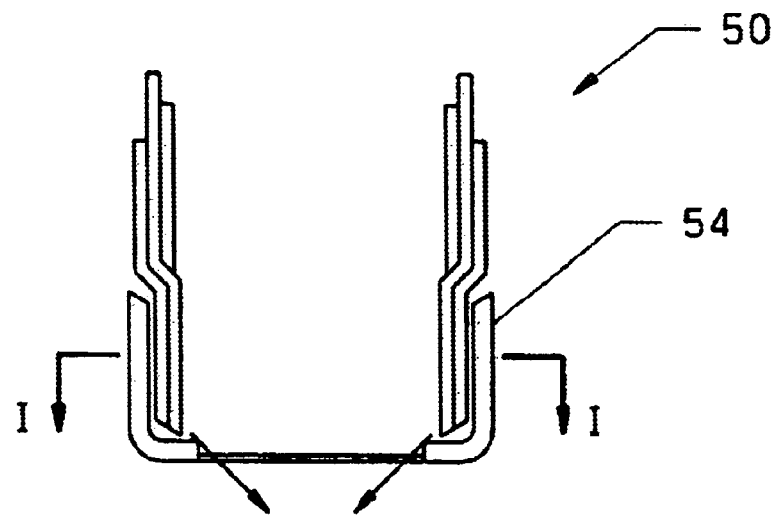
FIG. 9 is a side and bottom view of a waste retrever nozzle mounted to the side of the FIG. 1 arm.
Figure 9B:
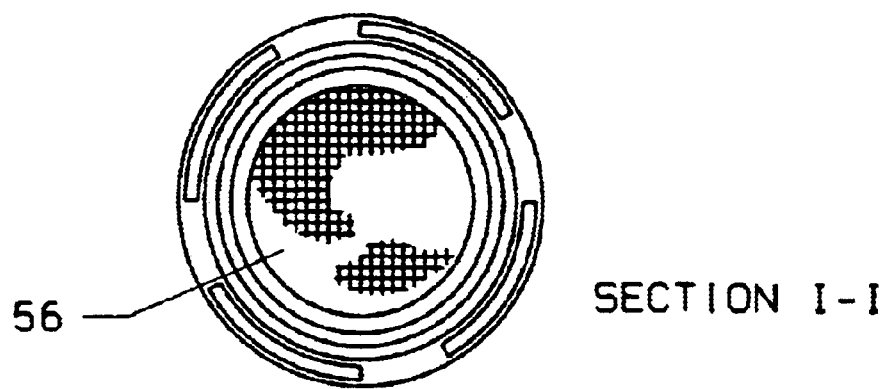

A waste retrieval nozzle (50) seen in FIG. 9 is mounted to the side of the Predator arm gripper (52) with an actuated sliding attachment (54). This permits relatively unrestricted operation with the wrist and gripper assembly (52) pointed straight or to the left. Some wrist yaw motion range is sacrificed when the yaw joint is rotated toward the hose. During normal use, the vacuum-nozzle will extend slightly beyond the gripper for mining activity. If, however, the gripper is needed to break up clumps, retrieve debris, or to carry other end effectors, such as a tool for loosening compacted material or the fixative spray tool, the vacuum-nozzle can be retracted to a less obtrusive position.

The vacuum nozzle (50) is designed to introduce the waste material into the vacuum conveyance hose (36). A half-inch screen mesh (56) is attached to the opening to keep large debris out of the waste stream. The nozzle (50) also features a carbureted design that assures a mixture of air and waste is introduced to the hose and minimizes the possibility of clogging the hose inlet.

To break up the material in front of the vacuum and to arrange the material in a pile near the end of the mining operation for more effective vacuuming, an air nozzle (58) is also included in the vacuum nozzle. This air nozzle can be remotely actuated from the control station. The two airjets can also blow across the front of the nozzle to relieve clogs. to The Turret/Clamp Assembly (60) provides rotational motion around the central vertical axis of the silo (12) opening (30) and clamps the uppermost link in place at all times, except when the mast (14) is being inserted or removed from the silo. The Turret/Clamp Assembly (60) also includes the rotating sleeve (48) that extends into the silo (12) within the non-rotating seal (62) joining the silo to the Gantry-Enclosure (34). The Turret/Clamp Assembly (60) is mounted onto a pre-positioned interface plate that forces alignment with the silo access hole (30). The Turret/Clamp central sleeve also serves as an attachment point for a mast Pan-Tilt-Zoom (PTZ) video camera inside the silo and for a cable reeling assembly (44) above the central sleeve.

The Cable/Hose Reel Assembly consists of the reel (44) for the arm and link umbilical cable/hose bundle (40) and a cable winch that lifts and lowers the mast (14) and provides a continuous tether all the way through the links to the Kraft Robot. These two lines compete with the conveyance hose for the area near the center of rotation. The entire assembly is mounted to the rotating Turret/Clamp (60) approximately 18 feet above the turret opening to allow introduction and removal of link (18) and vacuum hose segments. The reel is coupled to the cable winch motor through a slipclutch, so that the umbilical is under continuous light tension and cannot unwind as the mast is raised or lowered.

All of the control valves associated with the link hydraulic cylinder controls and any other remotely controlled valves within the mast (14) (pneumatic or hydraulic) are located inside the umbilical cable reel. This permits access and replacement or repair, if needed, while the arm remains in the silo. It also minimizes the number of hydraulic and pneumatic swivel channels required.

The Cable/Hose Reel Assembly (44) includes the swivels, twist cable connections, and festoon cable management components to permit the turret to rotate freely over the full range of rotation.

The silo (12) has a glove-bag access auxiliary silo opening (70) used is to pass auxiliary tools in to the Kraft Robot arm (28). Auxiliary tools can include various hand tools for agitating or breaking up the waste material. This eliminates the need to retract the ReTRIEVR System (10) back into the gantry enclosure (34) or tool change. The glove bag enclosure (70) does not require service personnel to don respirators or bubble suits to operate tools and perform other functions at the auxiliary opening. Segmented poles can be assembled inside the glove bag to extend the tools more than 10 feet into the silo (12). After the robot arm (28) has clasped the tool, a pneumatic release frees the pole from the tool. The pneumatic gripper pole can also be used to accept solid debris that the Kraft Robot may retrieve from the waste pile (small tools, wire, tape, etc.). Near the end of the cleanup task, a fixative spray tool will be introduced into the silo (12) through the same opening.

A hydraulic system provides the motive force for both the link cylinders (18) and the Kraft Robot arm (28). The arm (28) hydraulics consists of seven ser-valves that control six joints plus the gripper of the dexterous robotic arm (28). The valves are located near their actuators inside the arm. The Remote Servo Driver (RSD) mounted in the base of the arm controls these servo valves. A single hydraulic supply and return line supplies hydraulic pressure to the Kraft arm (28) header. A 27-pin electrical cable provides control demand signals to the servo valves. A potentiometer position feedback is provided to each servo amplifier to close the joint servo loop.

Video viewing is key to success of the operation. Two color cameras are provided in-Silo views of the ReTRIEVR operation. A Pan/Tilt/Zoom (PTZ) camera is mounted to the turret sleeve with the cables routed between the seal and the shelve. After insertion into the silo, the camera can be rotated out of the mast path with a long handled pole. If this camera needs to be changed during operation, the mast must first be removed. The failed camera can then be removed with a pole, repaired or replaced, then re-installed onto the Turret/Clamp sleeve. If the camera cables need replacing, replacement cables can be dropped in the annulus between the sleeve and seal, hooked with a pole through the sleeve, connected to the camera and the slack, then taken up as the camera is lowered to its sleeve mount.

A second fixed position zoom camera is located on the Kraft Robot arm (28) to view the gripper area and the vacuum nozzle. Both cameras have redundant integral lights and a pneumatic line to blow clear air in front of the viewing window.

Since the Silo-3 (12) is full to within a few feet of the top of the dome, the material is removed from the top to minimize arm impact loading from a "cave-in" of undercut material. After the first link (18) is fully inserted into the silo (12) the first mast joint will be articulated and the turret (60) rotated. The waste removal strategy is to vacuum as much material with the dexterous arm (28) as can be reached from a fixed mast (14) position, move the turret for a full 360 degree sweep, then articulate and/or insert the mast (14). This sequence will be repeated until most of the waste is removed from the silo (12). After the bulk of the material is emptied, the vacuum nozzle air jets (58) will aid the final cleanup; and a fixative spray will be fogged into the silo (12) to seal any remaining contamination.

Although ReTRIEVR system (12) has been primarily developed for the Silo-3 application, the design lends itself to other forms of waste removal requiring conveyance through an arm with strict contamination controls. Instead of dry caked material, the material could be hard or wet and could be mobilized with a slurry pump and the waste transported back through the arm.

The Silo-3 application is intended to transport all waste through a coiled conveyance hose. If excessive flow losses occur the vacuum system may be replaced with a pumped system.

The ReTRIEVR design offers numerous advantages over many traditional long-reach-arm approaches for contaminated waste retrieval. Having workers manually install and remove the mast segments drastically reduces the enclosure demands. The simple clam-shell-closure links and two-pin link unions make insertion and withdrawal relatively simple. The large working channel through the mast center facilitates waste conveyance. Although the arm is designed for reliable operation, if failures do occur, practically all failure scenarios are "fail safe" such that extraction is assured.

Certain details and modifications have been deleted herein for the sake of conciseness and readability but are fully intended to be within the scope of the following claims.

What is claimed is:

1. An incremental link robot mast assembly adapted for removing waste material from a storage silo having a dome with a limited access top opening comprising:

a mast assembly extending through the top opening made up of incrementally linked segments;

a robot arm operatively connected to said mast assembly at one end of said mast assembly and adapted for holding various tools for actuating the removal of waste from the silo through said mast assembly;

each of said segments of said mast assembly being selectively linked to each other by a transverse pin and hydraulic connections; and each of said segments being enclosed in a clamshell structure and having means therein to aid the removal of waste materials from the silo through said mast assembly.

2. An incremental link robot mast assembly for removing waste material as set forth in claim 1 wherein each clamshell structure comprises a hinged circumferential enclosure having an alignment groove extending vertically thereon to align each selected connecting segment.

3. An incremental link robot mast assembly for removing waste material as set forth in claim 2 wherein each clamshell structure is latched together by an array of screws.

4. An incremental link robot mast assembly for removing waste material as set forth in claim 3 wherein the clamshell segments nearer the silo dome are lighter in weight than the segments near said robot arm.

5. An incremental link robot mast assembly for removing waste material as set forth in claim 1 wherein said silo is a site 3 silo holding nuclear waste therein and said means for aiding removal includes a vacuum line extending through said mast assembly to said robot arm for vacuuming the waste therethrough.

6. An incremental link robot mast assembly for removing waste material as set forth in claim 5 wherein said vacuum line is spaced in each clamshell structure to be at least one in away from said clamshell to prevent loading.

7. An incremental link robot mast assembly for removing waste material as set forth in claim 6 wherein said means for aiding removal includes an air hose extending through said mast assembly to said robot attached thereto for blowing away waste material.

8. An incremental link robot mast assembly for removing waste material as set forth in claim 7 wherein said robot arm has means for grasping tools not extending through said mast assembly for removing waste material which is not readily removed by vacuuming.

9. An incremental link robot mast assembly for removing waste material as set forth in claim 8 including a video camera attached to said robot arm for viewing the waste material.

* * * * *